(No Model.)
J. LIMING.
FLUID PUMP.
No. 512,978. Patented Jan. 16, 1894.
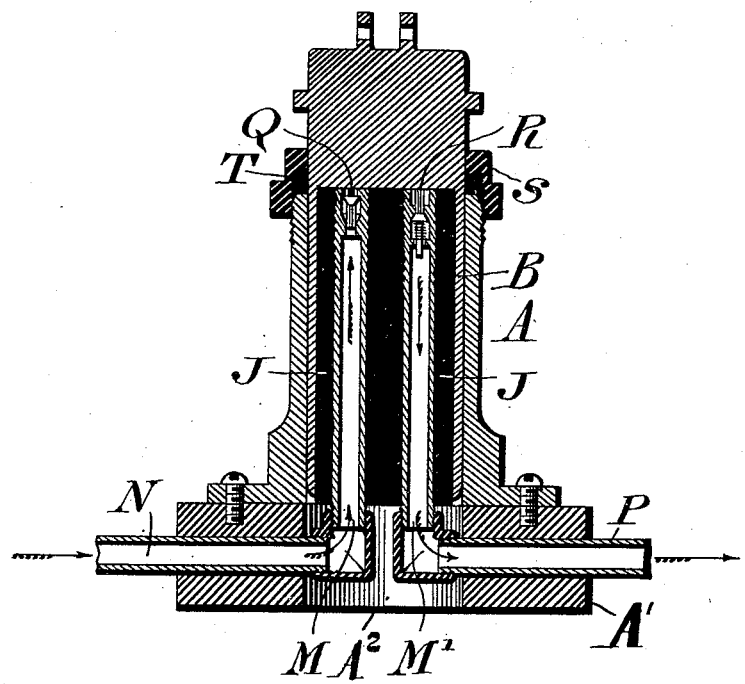
WITNESSES:
INVENTOR
ATTORNEY.

UNITED STATES PATENT OFFICE.

JOHN LIMING, OF MOUNT ALVERNO, PENNSYLVANIA.

FLUID-PUMP.

SPECIFICATION forming part of Letters Patent No. 512,978, dated January 16, 1894.

Application filed January 24, 1893. Serial No. 459,549. (No model.)

*To all whom it may concern:*

Be it known that I, JOHN LIMING, a citizen of the United States, residing at Mount Alverno, county of Delaware, State of Pennsylvania, have invented a new and useful Improvement in Fluid-Pumps, which improvement is fully set forth in the following specification and accompanying drawing.

My invention relates to improvements in liquid pumps, and consists of a pump formed of a barrel, and a hollow plunger fitting therein, and guided on the inner face thereof an inlet pipe and an outlet pipe, each having a controlling valve, and packing filling the space in said barrel surrounding the said pipes, said parts being so connected that the valves can be readily reached when desired.

The figure represents a vertical section of a fluid pump embodying my invention.

Referring to the drawing: A designates a barrel secured to a base A', and B designates a hollow plunger which is guided in its movements on the inner face of the barrel. Within the barrel are the pipes M and M' both in communication at top with the interior of the plunger, the pipe M having the supply pipe N connected with it, and the pipe M' having the discharge pipe P connected with it. Surrounding the pipes M and M' and filling the space between said pipes and the sides of the plunger is the packing J, said packing thus being common to said pipes M, M' and the plunger B, forming a tight joint and also adding to the strength and solidity of the pump.

Within the pipe M at the top thereof is the valve Q, and within the pipe M' at the top thereof is the valve R, said valves Q and R opening and closing in opposite directions, it being seen that when the plunger is raised, the valve Q opens, and the valve R closes. Air or other fluid is now drawn through the pipe N into the pipe M', and plunger B, and when the plunger is lowered, the valve Q closes and the valve R opens, the fluid then being forced through the pipe M' into the discharge pipe P, and by the latter to the place of service, all of the fluid being displaced by the said plunger.

The base A' has a central opening $A^2$ with side openings leading therefrom, whereby the pipes N and P may be easily either connected or disconnected with the pipes M, M' for the purpose of removing the said pipes M, M', from the barrel when so desired.

When the plunger is removed, the valves Q and R are accessible, without dismembering the pump as such.

The plunger may be readily removed from the barrel, simply by withdrawing it clear of the barrel, and it may be easily restored by introducing it into the barrel between the packing and the barrel, thus again producing tight joints between the parts.

S designates a stuffing box at the joint of the barrel and plunger, the same containing the packing T which closes said joint, it being seen that as the plunger is doubly packed, there is produced a more complete vacuum when the pump is operated, the effect of which is evident.

Having thus described my invention, what I claim as new, and desire to secure by Letters Patent, is—

1. In a fluid pump having a barrel, a base, a hollow plunger guided on the inner face of said barrel, pipes in said barrel, one having an inlet and one an outlet valve at its upper end, packing which fills the space between the sides of said pipes and said plunger, and is connected to said pipes, said parts being combined substantially as described.

2. A fluid pump having a barrel, a base having a central opening with side openings leading therefrom, a plunger in said barrel, pipes in said barrel having valves at their upper ends opening in opposite directions, packing filling the space between the side of said pipes and plunger, and supply and discharge pipes in said side openings of the base, and connected with said valve pipes, substantially as described.

JOHN LIMING.

Witnesses:
JOHN A. WIEDERSHEIM,
A. P. JENNINGS.